(12) United States Patent
Dissinger (10) Patent No.: US 9,764,257 B2
(45) Date of Patent: Sep. 19, 2017

(54) HOSE-LESS SLUDGE REMOVAL APPARATUS WITH FLOW BALANCING DIAGONALS

(71) Applicant: Jim Myers & Sons, Inc., Pineville, NC (US)

(72) Inventor: Kerry Dissinger, Fort Mill, SC (US)

(73) Assignee: Jim Myers & Sons, Inc., Pineville, NC (US)

( * ) Notice: Subject to any disclaimer, the term of this patent is extended or adjusted under 35 U.S.C. 154(b) by 14 days.

(21) Appl. No.: 15/071,343

(22) Filed: Mar. 16, 2016

(65) Prior Publication Data

US 2016/0271526 A1    Sep. 22, 2016

Related U.S. Application Data

(60) Provisional application No. 62/134,393, filed on Mar. 17, 2015.

(51) Int. Cl.
| | |
|---|---|
| *B01D 21/18* | (2006.01) |
| *B01D 21/24* | (2006.01) |
| *B01D 21/00* | (2006.01) |

(52) U.S. Cl.
CPC ....... *B01D 21/245* (2013.01); *B01D 21/0003* (2013.01); *B01D 21/0087* (2013.01); *B01D 21/183* (2013.01)

(58) Field of Classification Search
CPC  B01D 21/0003; B01D 21/0087; B01D 21/18; B01D 21/183; B01D 21/245; B01D 21/2477
USPC ........................................ 210/523, 527, 803
See application file for complete search history.

(56) References Cited

U.S. PATENT DOCUMENTS

| | | |
|---|---|---|
| 747,113 A | 12/1903 | Allen |
| 3,494,462 A | 2/1970 | Baud |
| 3,559,740 A | 2/1971 | Scaggs |
| 3,746,089 A | 7/1973 | Vencil |
| 3,937,308 A | 2/1976 | Sukup |
| 4,090,966 A | 5/1978 | Clendenen |
| 4,401,576 A | 8/1983 | Meurer |
| 4,957,014 A | 9/1990 | Burke |
| 4,986,141 A | 1/1991 | Meurer |

(Continued)

OTHER PUBLICATIONS

Cross, H., *Analysis of Flow in Networks of Conduits or Conductors*, Bulletin No. 286, University of Illinois: Engineering Experiment Station (Nov. 1936) 26-28.

*Primary Examiner* — Christopher Upton
(74) *Attorney, Agent, or Firm* — Alston & Bird LLP (57) ABSTRACT

Apparatuses and methods are described herein. An example embodiment may include a balanced diagonal sludge removal assembly configured for use in a basin, the balanced diagonal sludge removal assembly including a discharge pipe, a collection pipe configured to slideably receive the discharge pipe, one or more header pipes extending from the collection pipe to define a first sludge communication path between the one or more header pipes and the collection pipe, and one or more balancing diagonals extending between the collection pipe and the one or more header pipes to define a second sludge communication path between the one or more header pipes and the collection pipe, wherein the one or more balancing diagonals balance flow distribution throughout the one or more header pipes.

20 Claims, 9 Drawing Sheets

(56) References Cited

U.S. PATENT DOCUMENTS

| | | | |
|---|---|---|---|
| 5,143,623 A | 9/1992 | Kroll | |
| 5,366,638 A * | 11/1994 | Moore | B01D 21/245 210/527 |
| 5,655,727 A | 8/1997 | Hanson et al. | |
| 5,911,241 A | 6/1999 | Roberts | |
| 5,914,049 A | 6/1999 | Brauch et al. | |
| 6,045,709 A | 4/2000 | Roberts | |
| 6,073,779 A * | 6/2000 | Shea | B01D 21/245 210/527 |
| 6,234,323 B1 * | 5/2001 | Sarrouh | B01D 21/18 210/523 |
| 6,354,328 B1 | 3/2002 | Roberts | |
| 6,497,249 B1 | 12/2002 | Swan et al. | |
| 6,951,620 B2 | 10/2005 | Brauch et al. | |
| 7,021,472 B1 | 4/2006 | Meurer | |
| 7,105,096 B2 | 9/2006 | Meurer | |
| 7,159,724 B2 | 1/2007 | Brauch et al. | |
| 7,169,312 B1 | 1/2007 | Meurer | |
| 2012/0318733 A1 * | 12/2012 | Zickert | B01D 21/18 210/527 |
| 2013/0118616 A1 | 5/2013 | Roberts et al. | |
| 2013/0118618 A1 | 5/2013 | Roberts | |
| 2013/0327706 A1 * | 12/2013 | Ursoi | B01D 21/245 210/527 |

* cited by examiner

HOSE-LESS SLUDGE REMOVAL APPARATUS WITH FLOW BALANCING DIAGONALS

CROSS-REFERENCE TO RELATED APPLICATION

This application claims the benefit of provisional application no. 62/134,393, filed on Mar. 17, 2015, and titled "HOSE-LESS SLUDGE REMOVAL APPARATUS WITH FLOW BALANCING DIAGONALS," which application is hereby incorporated by reference herein in its entirety.

FIELD OF THE INVENTION

Embodiments discussed herein relate to hose-less sludge removal apparatuses (also referred to herein as a balanced diagonal sludge removal assembly or simply "BDSRA") and, more particularly, to systems, methods, apparatuses, and other means for providing sludge collection, removal, and related functionality.

BACKGROUND

Sludge removal systems must collect sludge that is scattered across a collection basin, and often traditional sludge removal systems include a number of pipes that spread across the basin to collect the sludge. These traditional systems may frequently suffer from constricted and uneven flow caused by forcing the sludge through a narrow opening at one end of the pipes, which reduces the effectiveness of the sludge removal system overall and particularly at the extreme ends of the pipes.

Applicant has discovered various problems associated with the removal of sludge from a basin. Through applied effort, ingenuity, and innovation, Applicant has solved many of these identified problems by developing a solution that is embodied by the present invention as described in detail below.

BRIEF SUMMARY

Systems, methods, and apparatuses disclosed herein are related to a balanced diagonal sludge removal assembly and/or other external apparatuses. A balanced diagonal sludge removal assembly configured for use in a basin may be provided. The balanced diagonal sludge removal assembly may comprise a discharge pipe, a collection pipe configured to slideably receive at least a portion of the discharge pipe, such that the collection pipe may be configured to move in a longitudinal direction relative to the discharge pipe. The balanced diagonal sludge removal assembly may include one or more header pipes extending from the collection pipe to define a first sludge communication path between the one or more header pipes and the collection pipe. The balanced diagonal sludge removal assembly may further include one or more balancing diagonals extending between the collection pipe and the one or more header pipes to define a second sludge communication path between the one or more header pipes and the collection pipe. The one or more balancing diagonals may be configured to at least partially balance flow distribution throughout the one or more header pipes.

In some embodiments, the discharge pipe may define a discharge outlet configured to fluidly connect the assembly to the basin wall. The discharge pipe may be configured to discharge sludge from the basin via the discharge outlet. The one or more header pipes may define one or more collection apertures, and each of the collection apertures may be configured to receive, via vacuum pressure, sludge from the basin.

In some embodiments, the one or more balancing diagonals may further comprise a neck joint disposed proximate at least one of the collection pipe or the one or more header pipes. A portion of the one or more flow balancing diagonals extending between the neck joint and the at least one of the collection pipe or the one or more header pipe may be in perpendicular engagement with the at least one of the collection pipe or the one or more header pipe.

The collection pipe, the one or more header pipes, and the one or more balancing diagonals may be configured to move from a retracted position to an extended position, a greater portion of the discharge pipe may be received in the collection tube in the retracted position than in the extended position. In some embodiments, the collection pipe may define a solid collection discharge end configured to receive the discharge pipe therethrough to facilitate the movement of the collection pipe. A water-tight bearing seal may be disposed at the solid collection discharge end between the collection pipe and the discharge pipe, such that the water-tight bearing seal may be configured to receive the discharge pipe and seal the solid collection discharge end.

In some embodiments, the one or more headers may comprise a first header and a second header. The first header may be disposed parallel to the second header. The one or more balancing diagonals may comprise a first diagonal and a second diagonal. The first diagonal may extend between the collection pipe and the first header pipe, and the second diagonal may extend between the collection pipe and the second header pipe.

The first diagonal may engage the collection pipe closer to the second diagonal than to the first header, and the second diagonal may engage the collection pipe closer to the first diagonal than to the second header. In some embodiments, the first diagonal and the second diagonal may each engage the collection pipe proximate a longitudinal center of the pipe. The first header may be disposed proximate a solid collection discharge end of the collection pipe, and the second header may be disposed proximate an opposing end of the collection pipe. The first header and the second header may be collinear.

In another embodiment, a method for manufacturing a balanced diagonal sludge removal assembly configured for use in a basin may be provided. The method may comprise providing a discharge pipe, and providing a collection pipe configured to slideably receive at least a portion of the discharge pipe, such that the collection pipe is configured to move in a longitudinal direction relative to the discharge pipe. The method may further include attaching one or more header pipes to the collection pipe, such that the one or more header pipes may extend from the collection pipe to define a first sludge communication path between the one or more header pipes and the collection pipe. Some embodiments of the method may include attaching one or more balancing diagonals to the collection pipe and the one or more header pipes, such that the one or more balancing diagonals extend between the collection pipe and the one or more header pipes to define a second sludge communication path between the one or more header pipes and the collection pipe. The one or more balancing diagonals may be configured to at least partially balance flow distribution throughout the one or more header pipes.

In some embodiments, the one or more balancing diagonals may further comprise a neck joint disposed proximate at least one of the collection pipe or the one or more header pipes. A portion of the one or more flow balancing diagonals extending between the neck joint and the at least one of the collection pipe or the one or more header pipe may be in perpendicular engagement with the at least one of the collection pipe or the one or more header pipe.

The collection pipe, the one or more header pipes, and the one or more balancing diagonals may be configured to move from a retracted position to an extended position, and a greater portion of the discharge pipe may be received in the collection tube in the retracted position than in the extended position.

The one or more headers may comprise a first header and a second header. The first header may be attached to the collection pipe parallel to the second header. The one or more balancing diagonals may comprise a first diagonal and a second diagonal. The first diagonal may be attached between the collection pipe and the first header pipe, and the second diagonal may be attached between the collection pipe and the second header pipe. Attaching one or more balancing diagonals to the collection pipe and the one or more header pipes may comprise attaching the first diagonal to the collection pipe closer to the second diagonal than to the first header, and attaching one or more balancing diagonals to the collection pipe and the one or more header pipes may comprise attaching the second diagonal to the collection pipe closer to the first diagonal than to the second header. Attaching one or more balancing diagonals to the collection pipe and the one or more header pipes may comprise attaching each of the first diagonal and the second diagonal to the collection pipe proximate a longitudinal center of the pipe. In some embodiments, attaching one or more balancing diagonals to the collection pipe and the one or more header pipes may comprise attaching the first header to the collection pipe proximate a solid collection discharge end of the collection pipe, and the second header may be disposed proximate an opposing end of the collection pipe. The first header and the second header may be collinear.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments of the inventions are illustrated. It should be appreciated that the size and thickness of components illustrated in the accompanying drawings may differ from the physical size and physical thickness of the components and that the thickness of some portions are drawn on an enlarged scale for better comprehension and ease of description. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

OVERVIEW

Various embodiments of the present invention are directed to an improved solid removal assembly for a basin. This improved assembly or balanced diagonal sludge removal assembly (or simply "BDSRA") is structured to provide hose-less removal of sludge from a basin. The BDSRA is structured to include balancing diagonals that help to even flow distribution through header pipes within the BDSRA and otherwise improve the efficiency of solids removal across the basin floor.

Embodiments of the present invention are illustrated in the appended figures and description below. As will be apparent to one of ordinary skill in the art in view of this disclosure, the inventive concepts herein described may be applied to various applications.

EXAMPLE BALANCED DIAGONAL SLUDGE REMOVAL ASSEMBLY

A "BDSRA" as used herein refers to a sludge removal assembly that may be positioned at the bottom of water treatment facility basins which includes balancing diagonals as described herein below. One or more pumps (not shown) may apply a vacuum pressure the BDSRA for drawing sludge into one or more pipes of the BDSRA for eventual removal from the basin. The term "sludge" as used herein refers to fluids, solids, or a mixture of fluids and solids. For example, sludge may be found in and removed from a basin of a plate settler in a wastewater treatment facility. In various embodiments, as discussed in detail below, sludge moves through one or more balancing diagonals that are structured to balance flow distributions within some of the pipes to improve the efficiency of the assembly.

Figure 1A:
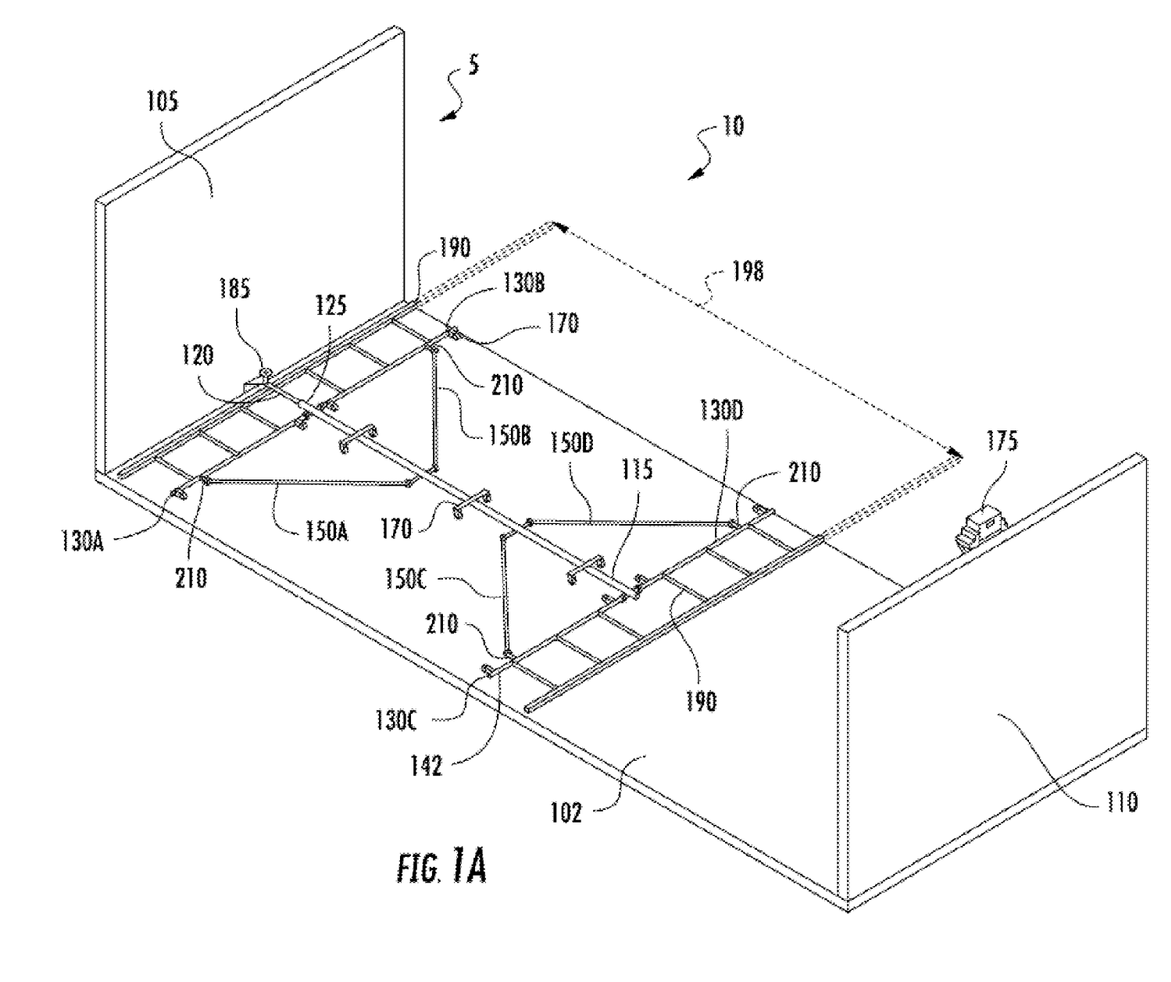
FIG. 1A illustrates a top perspective view of a balanced diagonal sludge removal assembly structured in accordance with certain embodiments.
Figure 1B:
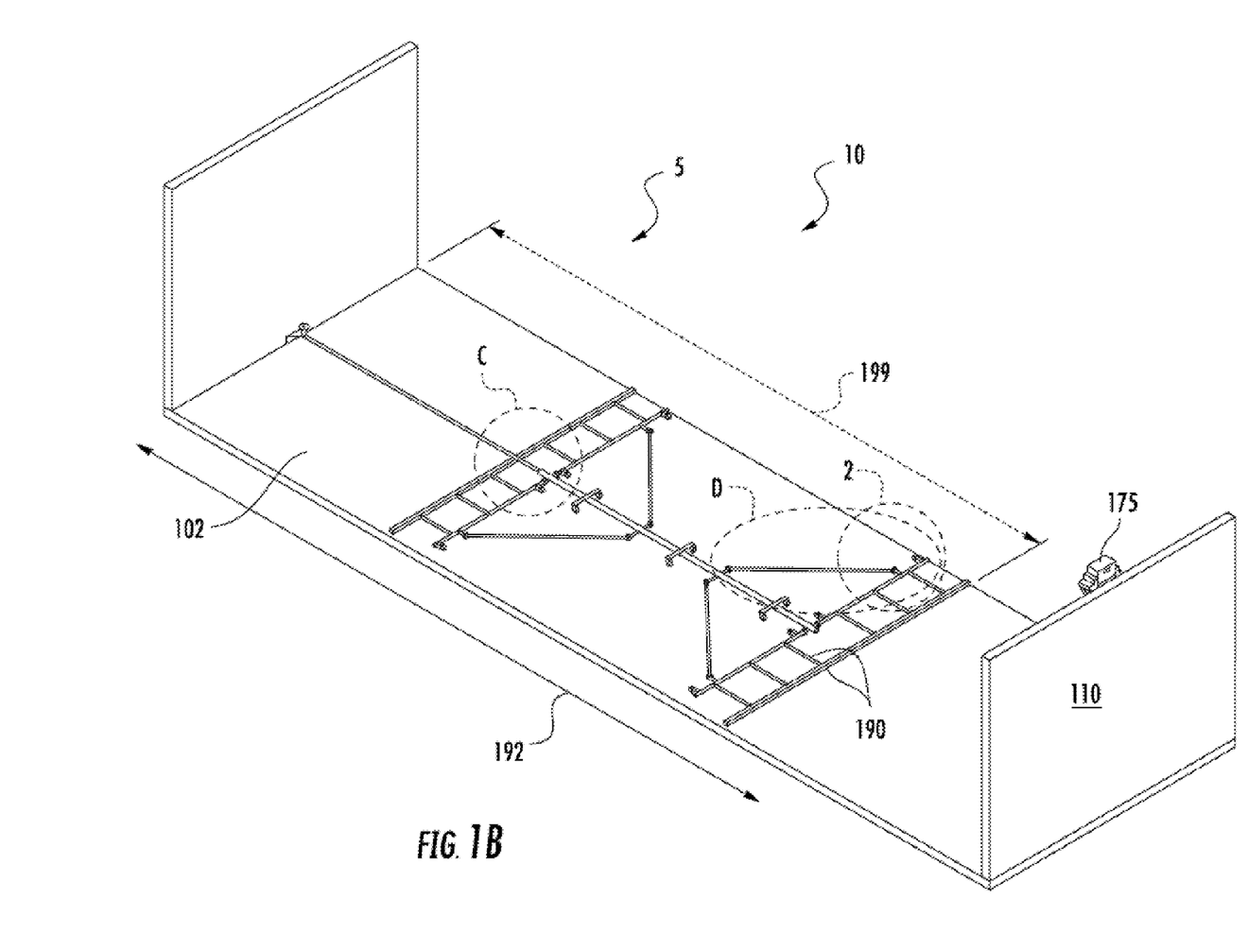
FIG. 1B illustrates a top perspective view of a balanced diagonal sludge removal assembly structured in accordance with certain embodiments.
Figure 3A:
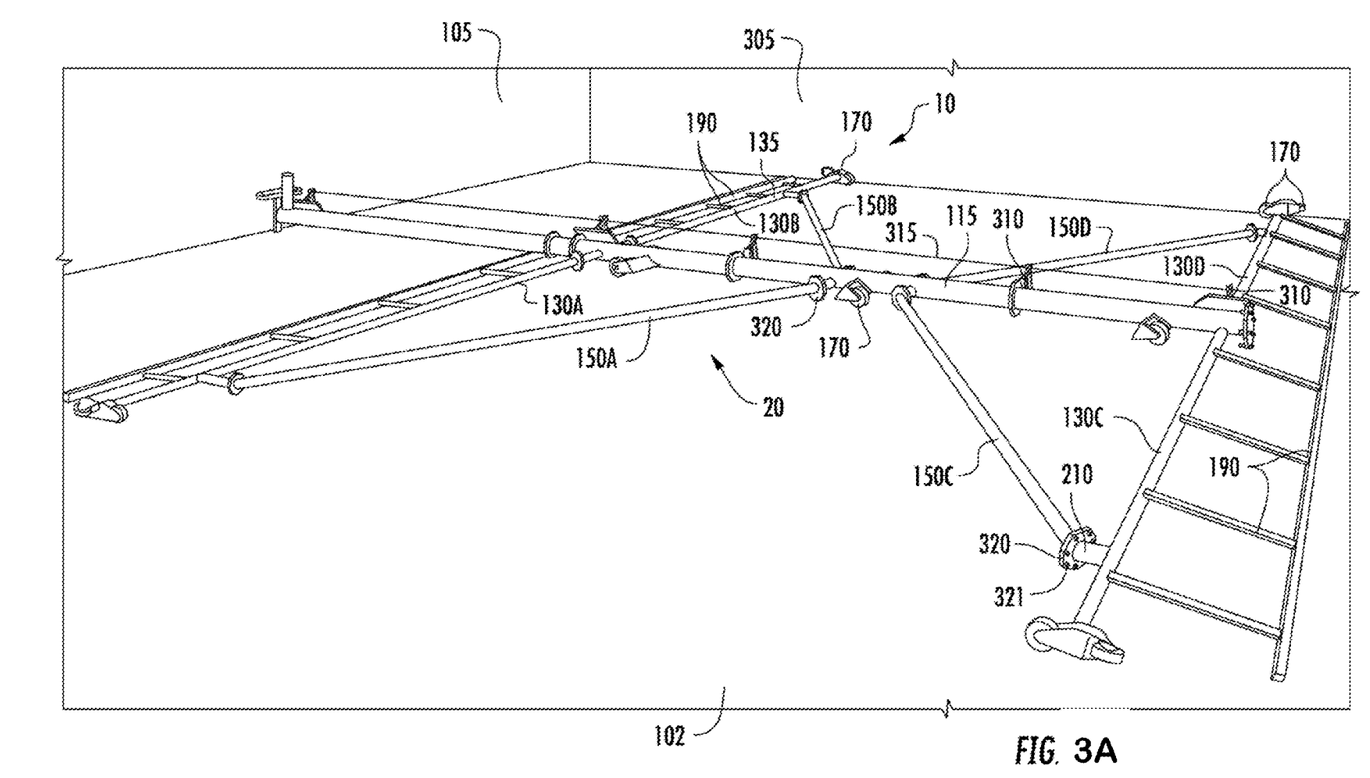
FIG. 3A illustrates a perspective view of a balanced diagonal sludge removal assembly structured in accordance with various embodiments.

FIGS. 1A-1B and 3A depict a BDSRA 10 structured in accordance with some embodiments described herein. The depicted BDSRA 10 is configured for use in a basin 5. The BDSRA 10 includes a plurality of pipes (each as discussed below) that may be submerged within basin 5 (e.g., a water treatment facility basin). The BDSRA 10 may be resistant to rust and corrosion by being submerged within the basin 5 and/or by being constructed of rust and corrosion resistant materials. In some embodiments, BDSRA 10 may be made at least partially of stainless steel (e.g., 16 gauge stainless steel tubing) and various non-metallic components that inhibit rust and corrosion. In some embodiments, BDSRA 10 may be manufactured from any suitable material and/or combination of materials that operate to provide sufficient strength while resisting rust and corrosion. For example, BDSRA 10 may be made from stainless steel, fiber-reinforced composites, aluminum, and plastic composites.

With continued reference to FIGS. 1A-1B and 3A, the depicted BDSRA 10 includes a collection pipe 115 that receives sludge flowing in from the basin through one or more header pipes 130A-D. In some embodiments, the collection pipe 115 includes a sufficiently large diameter to slideably receive a discharge pipe 120 through at least one solid collection discharge end 125 of collection pipe 115. As discussed herein, the collection pipe 115 may be sufficiently larger than the discharge pipe 120 to define a sludge communication path between the collection pipe and the discharge pipe.

Figure 1C:
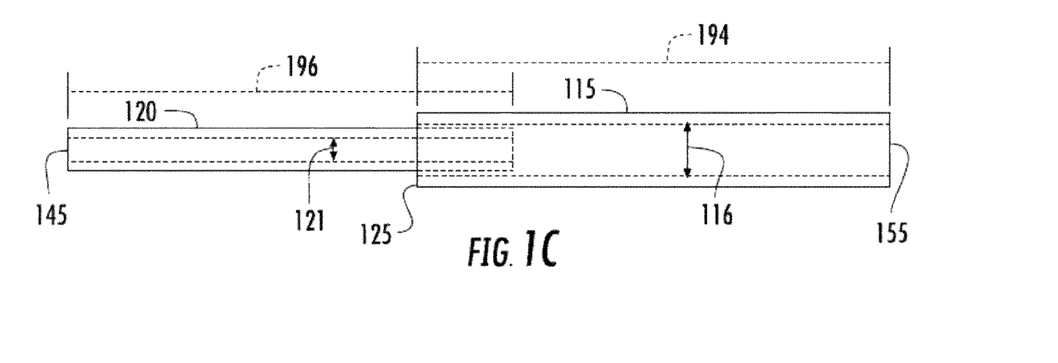
FIG. 1C illustrates a detail side view of a discharge pipe and a collection pipe of the balanced diagonal sludge removal assembly shown in FIG. 1B taken at Detail Circle C.
Figure 1D:
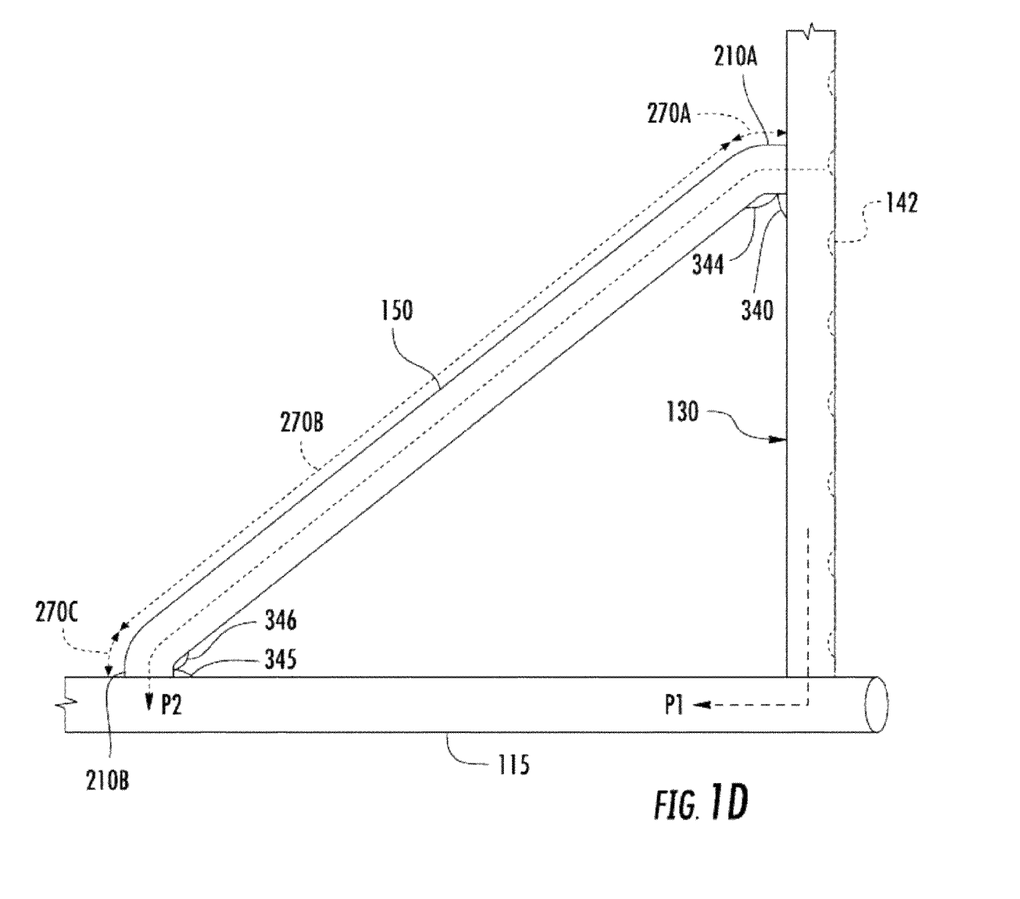
FIG. 1D illustrates a detail top view of a collection pipe, balancing diagonal, and header pipe of the balanced diagonal sludge removal assembly shown in FIG. 1B taken at Detail Circle D.

The depicted BDSRA 10 further includes one or more header pipes 130A-D extending from the collection pipe 115 to define a first sludge communication path P1 (e.g., as depicted in FIG. 1D) between one or more header pipes 130A-D and collection pipe 115. Header pipes 130A-D are configured to remove sludge from basin floor 102 as the collection pipe 115, header pipes 130A-D, and diagonals 150A-D travel across the basin 5. As described herein with reference to FIG. 2, each of the depicted header pipes 130A-D defines one or more collection apertures 142 through which sludge flow from the basin 5 into the BDSRA 10. In some embodiments, one or more of the header pipes 130A-D extends from the collection pipe 115 perpendicular to the collection pipe, such that the header pipes may be oriented perpendicular to a longitudinal direction of travel of the collection pipe to cover the largest possible area of the basin.

The depicted BDSRA 10 includes one or more balancing diagonals 150A-D extending between collection pipe 115 and header pipes 130A-D to define a second sludge communication path P2 (as depicted in FIG. 1D) between the one or more header pipes 130A-D and the collection pipe 115. One or more balancing diagonals 150A-D are configured to balance flow distribution throughout one or more header pipes 130A-D by receiving a portion of the sludge collected in the collection apertures 142. In some embodiments, balancing diagonals 150A-D extend diagonally from one or more header pipes 130A-D to collection pipe 115 as illustrated in FIG. 1A. The balancing diagonals 150A-D may extend to a different longitudinal position on the collection pipe 115 than the header pipes 130A-D to reduce constriction and balance the flow in the collection pipe.

In some embodiments, the balancing diagonals 150A-D may form a 90 degree elbow, a chamfer-like structure, or other connecting structure between header pipes 130A-D and collection pipe 115. In this regard, balancing diagonals 150A-D may minimize the effect of differential pressure across header pipes 130A-D. In the depicted embodiment, balancing diagonals 150A-D are configured to receive sludge from one or more header pipes 130A-D.

Turning to FIGS. 1A-1C and 3A, the depicted discharge pipe 120 is slideably received within the collection pipe 115, such that the collection pipe may move longitudinally along the discharge pipe. A water-tight bearing seal (not shown) or gasket may be positioned at a solid collection discharge end 125 of the collection pipe 115 for slideably receiving discharge pipe 120. The seal may extend between an inner surface of the collection pipe 115 and an outer surface of the discharge pipe 120 and may move with the collection pipe. The discharge pipe 120 may extend through a discharge outlet defined in the sidewall (e.g., first wall 105) of basin 5 such that sludge moving through discharge pipe 120 is directed to flow out of basin 5. Although the figures may omit one or more walls for ease of illustration, in each of the embodiments detailed herein, the basin 5 may include at least four sidewalls. In some embodiments, the discharge pipe 120 remains stationary within the basin 5, attached to the wall of the basin 5, and the collection pipe 115, diagonals 150A-D, and header pipes 130A-D moves longitudinally along the discharge pipe across the basin. Although single collection pipe 115 and discharge pipe 120 are depicted, one of ordinary skill in the art will readily appreciate that a BDSRA, such as BDSRA 10, may include a plurality of collection pipes 115 and/or discharge pipes 120. For example, basin 5 may include a plurality of BDSRAs.

The discharge pipe 120 defines a length that extends partially across the basin. In some embodiments, the discharge pipe 120 may extend less than halfway across the basin. In some embodiments, the collection pipe 115 is approximately 55% of the length of the basin, and in some embodiments, the collection pipe may be longer or shorter. In some embodiments, the collection pipe 115 is configured to travel at least as far as the distance between parallel, spaced header pipes 130A-D such that the coverage of the header pipes overlaps. For example, in embodiments having two pairs of collinear header pipes 130A-D as shown in FIGS. 1A, 1B, and 3A, the length of the collection pipe 115 is approximately 55% of the basin length to overlap coverage of one a first pair of headers 130A-B and a second pair of headers 130C-D at the longitudinal center of the basin.

With reference now to FIGS. 1A and 1B, the collection pipe 115, header pipes 130A-D, and diagonals 150A-D of the BDSRA 10 move across basin floor 102 from a retracted position (shown in FIG. 1A), in which the first pair of headers 130A-B may be disposed proximate the first wall 105, to an extended position (shown in FIG. 1B), in which the second pair of headers 130C-D may be disposed proximate the second wall 110 of the basin. The extended position may be defined as the furthest distance from the discharge outlet 185 that the collection pipe 115 may travel, and the retracted position may be defined as the closest the collection pipe travels to the discharge outlet. The depicted BDSRA 10 includes a plurality of rolling supports 170 (e.g., casters or wheels) for supporting BDSRA 10 as it moves (e.g., rolls) across basin floor 102. As discussed above, the header pipes 130A-D collect sludge as the collection pipe 115, header pipes 130A-D, and diagonals 150A-D of the BDSRA 10 travel across the basin 5.

In one embodiment, drive system 175, which may include a motor, may actuate cable 315 and pulleys 310 as described herein below with reference to FIG. 3A to move the collection pipe 115, header pipes 130A-D, and diagonals 150A-D of the BDSRA 10 along basin floor 102 from the retracted position to the extended position. Similarly, in various embodiments, the drive system 175 may actuate cables 315 and pulleys 310 to move the components of the BDSRA 10 along basin floor 102 in an opposite direction from the extended position (shown in FIG. 1B) to the retracted position (shown in FIG. 1A).

In some embodiments, the BDSRA 10 may further include one or more disturbing members 190 configured to disturb (e.g., move, scrape, disperse, break up, etc.) solids that have collected on basin floor 102. For example, the depicted scraping members 190 are laterally oriented (e.g., perpendicular to the collection pipe 115) longitudinal members configured to ride along the floor 102 of the basin 5 to disturb any collected solids. The depicted scraping members 190 are offset from the header pipes 130A-D by a plurality of rigid support beams, and the scraping members 190 are disposed at the opposing ends of the BDSRA 10, such that the scraping members may disturb any solids prior to a leading header (e.g., the forward most header in the direction of movement of the BDSRA components) collecting the solids. In such embodiments, as the drive system 175 moves the collection pipe 115, header pipes 130A-D, and diagonals 150A-D of the BDSRA 10 from retracted position 198 to extended position 199, solids that have collected on the basin floor 102 may be dislodged. This scraping of solids may improve the efficiency by which solids are drawn by header pipes 130A-D into the BDSRA 10. In some embodiments, the disturbing members 190 may contact one or more walls (e.g., one or more of walls 105, 110) of the basin 5 during movement of the BDSRA 10 components, and in some embodiments, the disturbing members may limit the range of motion of the headers 130. In such embodiments, the disturbing members 190 may be positioned closely enough to the headers 130 to allow the headers to collect sludge disturbed by the disturbing members.

FIG. 1C illustrates a detail view of the collection pipe 115 and the discharge pipe 120. The depicted collection pipe 115 conveys sludge to discharge pipe 120, and the depicted collection pipe 115 receives sludge from at least one of balancing diagonal 150A-D and header pipes 130A-D (as described herein with reference to FIGS. 2 and 1D).

While FIGS. 1A-1B and 3 depict collection pipe 115 as configured to receive sludge from one or more header pipes 130A-D and from one or more balancing diagonals 150A-D, in some embodiments, a collection pipe, such as collection pipe 115, is configured to receive sludge from one or more headers pipes only via one or more balanced diagonals. For example, one or more header pipes may not be coupled to a collection pipe. In such example embodiments, sludge may be received by a collection pipe via one or more balancing diagonals extending from a header pipe.

In FIG. 1C, the depicted collection pipe 115 defines a collection pipe length 194 (e.g., approximately six (6) feet) and may define an inner collection diameter 116 (e.g., approximately seven (7) inches). Inner collection diameter 116 may define a minimum of approximately four (4) inches to a maximum of approximately eight (8) inches in other embodiments. The depicted discharge pipe 129 may define a discharge pipe length 196. In some preferred embodiments, discharge pipe length 196 measures approximately twenty (20) feet. The discharge pipe length may range from a minimum of one (1) foot to a maximum of one thousand (1000) feet, and the length may depend upon the length of the basin. Discharge pipe 120 may provide a channel for conveying sludge received from collection tube 115 to discharge outlet 185. The interior of the discharge pipe 120 defines an inner discharge diameter 121, which in some embodiments may be, for example, approximately four (4) inches. In some alternative embodiments, inner discharge diameter 121 may define a minimum of two (2) inches to a maximum of eight (8) inches.

With continued reference to FIGS. 1A-1C, the discharge pipe 120 terminates within the collection pipe 115 proximate a middle of the basin to allow the collection pipe 115 to reach the extended position (as shown in FIG. 1B) without disconnecting from the discharge pipe and to reach the retracted position (as shown in FIG. 1A) without contacting the end of the discharge pipe. This may cause sludge from the effluent end to travel in a space between the discharge pipe 120 and the collection pipe 115 to reach an opening in the discharge pipe at the middle of the basin (e.g., the space between the discharge pipe 120 and the collection pipe 115 shown in FIG. 1C). This space between the discharge pipe 120 and collection pipe 115 provides a narrower flow area than the total diameter of the collection pipe 115. As such, the flow from the header pipes at the influent end of the collection pipe 115 (e.g., the header pipes 130 farthest from the discharge outlet 185) is received in a larger flow area within the collection pipe than the header pipes at the effluent end of the collection pipe 115 (e.g., the header pipes 130 closest to the discharge outlet 185) due 115 to the discharge pipe 120 generally not blocking the collection pipe at the far end opposite the discharge outlet 185. Said differently, the discharge pipe 120 may not obstruct the influent headers for large portions of the travel of the BDSRA 10 components (e.g., the discharge pipe 120 may be closer to the influent header pipes in the retracted position).

Figure 2:
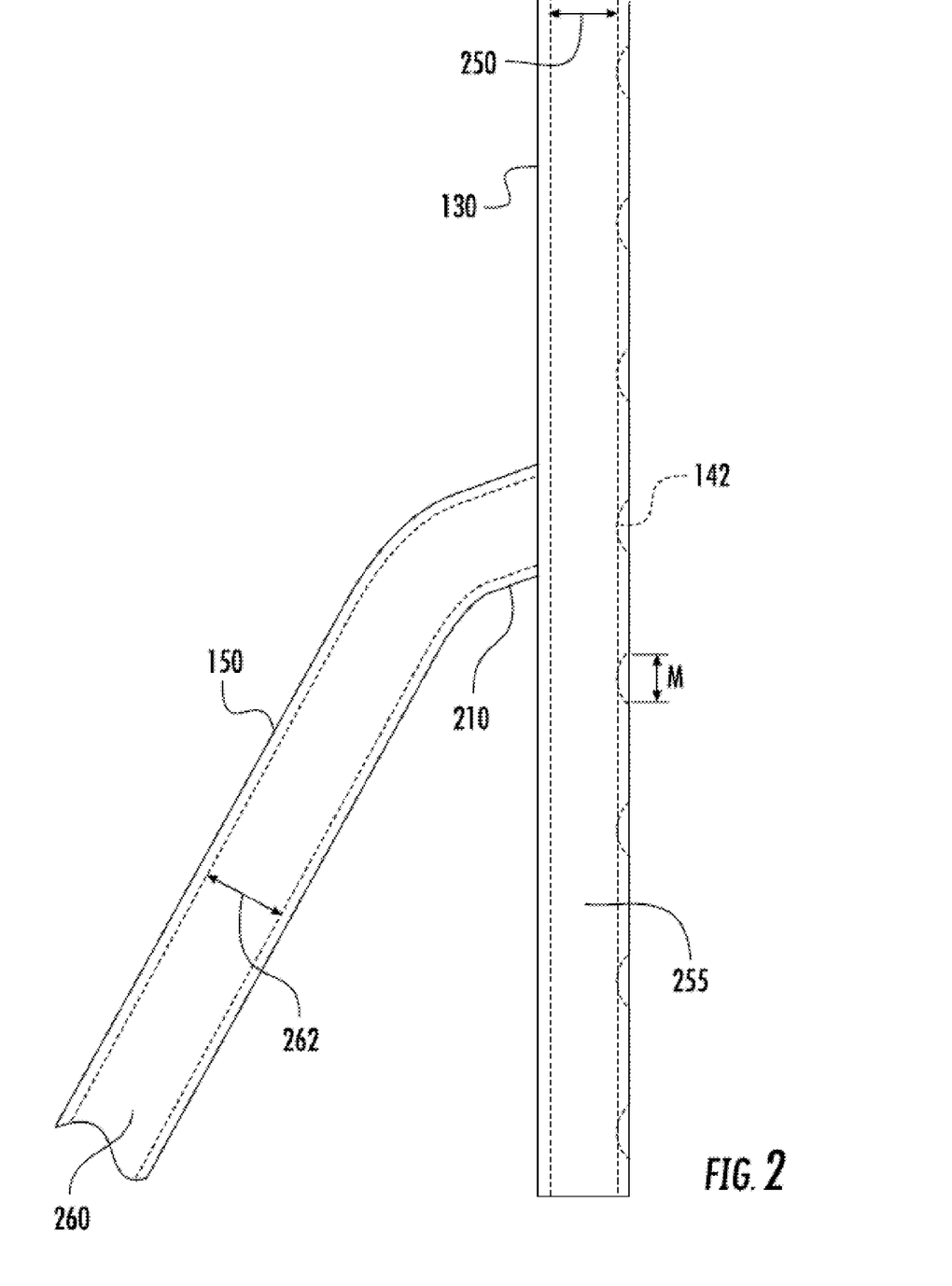
FIG. 2 illustrates a detail view of a header pipe and a balancing diagonal of the balanced diagonal sludge removal assembly shown in FIG. 1B taken at Detail Circle 2.

FIG. 2 illustrates a detail view of header pipe 130 and balancing diagonal 150 according to some embodiments discussed herein. The header pipes 130 define one or more collection apertures 142 for receiving sludge into the BDSRA 10. A plurality of collection apertures 142 may be defined along a length of each header pipe 130. In some embodiments, header pipe 130 may define a single collection aperture 142 or a greater quantity of collection apertures 142 than the quantity depicted in FIG. 2. Each collection aperture 142 is configured to receive sludge from basin 5 via vacuum pressure applied to the BDSRA 10 (e.g., via a pump system fluidly connected to the discharge pipe). One of ordinary skill in the art will readily appreciate that other like forms of suction, pumps, or aspirators may be utilized in other embodiments. In some embodiments, collection aperture 142 may have a diameter M of approximately three (3) inches. In some embodiments, collection aperture 142 may include a diameter of a minimum of two (2) inches to a maximum of six (6) inches. In some embodiments, the header pipes 130A-D may define an inner header diameter 250 of approximately 2.87 inches. In other embodiments, the inner header diameter 250 may measure a minimum of two (2) inches to a maximum of eight (8) inches.

FIG. 2 depicts an embodiment of a balancing diagonal 150 extending from a header pipe 130 and thereby defining second sludge communication path P2 (e.g., an alternative path referenced in FIG. 1D) for sludge to travel between the header pipe and the collection pipe 115 and further providing a balancing effect on the flow received by collection apertures 142. For example, flow pressure at the distal ends of the headers (e.g., the ends opposite the collection pipe 115) may be substantially balanced with flow pressure at the collection pipe as described below, such that even suction may be applied at each aperture 142. The balancing diagonal 150 may define a diagonal length extending between the header pipe 130 and a different location on the collection pipe 115 than the header as shown in FIG. 1D. The depicted diagonal length of the balancing diagonal may include length 270A (e.g., the length of first neck joint 210A), length 270B (e.g., the length along the diagonal disposed between first neck joint 210A and second neck joint 210B), and length 270C (e.g., the length of second neck joint 210B) which may measure approximately three (3) inches. In some embodiments, the diagonal length may range from a minimum of two (2) inches to a maximum of six (6) inches. Each balancing diagonal 150 may be structured to receive sludge from header pipe 130. The balancing diagonal 150 may define an inner balancing diameter 262 of approximately 2.87 inches. In some embodiments, the inner balancing diameter 262 may measure a minimum of two (2) inches to a maximum of six (6) inches.

Turning back to FIG. 2, the depicted balancing diagonal 150 may further include neck joint 210 disposed proximate at least one of collection pipe 115 (shown in FIG. 3A) or header pipe 130. In some preferred embodiments, the neck joint 210 is configured to define an angle from approximately thirty (30) degrees to approximately of forty-five (45) degrees. In some embodiments, the neck joint 210 may position a portion of the length of the diagonal (e.g., length 270A shown in FIG. 1D) perpendicular to the header pipe 130. Similarly, a second neck may position a second length (e.g., length 270C shown in FIG. 1D) perpendicular to the collection pipe 115. In some alternate embodiments, the balancing diagonal 150 may be coupled to header pipe 130 or collection pipe 115 without the inclusion of a neck joint 210. For example, balancing diagonal 150A-D may proceed directly to header pipes 130A-D at the angle of the balancing diagonal (e.g., the angle of the second length 270B shown in FIG. 1D). As discussed below, a flange or gasket (e.g., plates 320 shown in FIG. 3A) may be positioned at one or more bends or joints in the balancing diagonal.

With reference to FIG. 3A, the BDSRA 10 includes one or more header pipes 130A-D as described above in FIGS. 1A-1B and 2. One or more header pipes 130A-D are configured to receive sludge via the one or more collection apertures 142 as described with reference to FIG. 2. In some embodiments, four or more header pipes 130A-D may be used with four corresponding balancing diagonals 150A-D. In some embodiments, as discussed herein, a first pair of header pipes 130A-B may be collinear and parallel with a second pair of collinear header pipes 130C-D. The four depicted balancing diagonals 150A-D may be disposed between and may extend between the collection pipe 115 and each of the four header pipes 130A-D. As sludge is received by one or more header pipes 130A-D, the sludge may move from the one or more header pipes 130A-D into one or more balancing diagonals 150A-D and/or directly into the collection pipe 115. The one or more balancing diagonals 150A-D and the one or more header pipes 130A-D may define first diagonal angle 340 (depicted in FIG. 1D). In a preferred embodiment, one or more balancing diagonals 150A-D and one or more header pipes 130A-D define a ninety (90) degree first diagonal angle between the neck portion (e.g., perpendicular neck portion 210A detailed above with respect to FIG. 1D) of the diagonal and the header pipe, which may provide strength and stabilization for balancing the passage of sludge from one or more header pipes 130A-D into one or more balancing diagonals 150A-D. As depicted, one or more balancing diagonals 150A-D and one or more neck joints 210 define second diagonal angle 341 (depicted in FIG. 1D) configured to measure approximately forty-five (45) degrees. In some embodiments, the net angle between the main body (e.g., length 270B shown in FIG. 1D) of the diagonal 150 and the header pipe 130 may be from thirty (30) degrees to forty-five (45) degrees as detailed above. In some embodiments, the first diagonal angle 340 and the second diagonal angle 341 may measure any angle in the range between zero (0) and one-hundred eighty (180) degrees.

The depicted collection pipe 115 receives sludge from one or more balancing diagonals 150A-D along second sludge communication path P2 (as depicted in FIG. 1D). Additionally, the depicted collection pipe 115 receives sludge from one or more header pipes 130A-D via first sludge communication path P1 (e.g., the sludge pass through the header pipes directly into the collection pipe as depicted in FIG. 1D). The depicted one or more balancing diagonals 150A-D and collection pipe 115 define third diagonal angle 345 (depicted in FIG. 1D). FIG. 1D depicts one or more balancing diagonals 150A-D and collection pipe 115 which may define a ninety (90) degree third diagonal angle 345 between the neck portion (e.g., perpendicular neck portion 210B detailed above with respect to FIG. 1D) of the diagonal and the collection pipe 115 and may provide strength and stabilization for balancing the passage of sludge from one or more balancing diagonals 150A-D into collection pipe 115. One or more of the balancing diagonals 150A-D and one or more of the neck joints 210 may define fourth diagonal angle 346 (depicted in FIG. 1D) configured to measure approximately forty-five (45) degrees. In some embodiments, the net angle between the main body (e.g., length 270B shown in FIG. 1D) of the diagonal 150 and the collection pipe 115 may be from forty-five (45) degrees to sixty (60) degrees. In some embodiments, third diagonal angle 345 and fourth diagonal angle 346 may measure any angle in the range between 0 and 180 degrees. As will be appreciated by one of ordinary skill in the art, first diagonal angle 340, second diagonal angle 341, third diagonal angle 345, and fourth diagonal angle 346 may vary in accordance with the length and width of the basin.

The depicted one or more balancing diagonals 150 further include a neck joint 210 disposed proximate at least one of collection pipe 115 or header pipe 130. Opposed junction plates 320 of the depicted embodiment secure the neck joints 210 of the one or more balancing diagonals 150A-D. One or more fasteners (e.g., bolts 321) may secure junction plates 320 of the one or more balancing diagonals 150A-D to each other. In some embodiments, a water-tight gasket may be disposed between opposed junction plates 320 to ensure a water tight seal as may be apparent to one of ordinary skill in the art in view of this disclosure. In another embodiment, one or more alternate fasteners may take the form of bolts, screws, nuts, threaded inserts, or any other type of mechanical fastener for securing junction plates 320. While not specifically called out in every instance for greater simplicity in this disclosure, one of ordinary skill in the art may readily note that opposed junction plates 320 may be used to couple together various pipes within the BDSRA 10 system.

The BDSRA 10 (e.g., the collection pipe 115, header pipes 130A-D, and diagonals 150A-D of the BDSRA) moves from retracted position 198 to extended position 199 as described herein with reference to FIGS. 1A-1B, while the discharge pipe 120 remains stationary in the basin. In such embodiments, the BDSRA 10 may further include a cable 315, pulleys 310, and rolling supports 170 as depicted. The BDSRA 10 may be actuated by drive system 175 via cable 315. The drive system 175 may be configured to move the BDSRA 10 along cable 315 throughout basin floor 102. For example, at least the collection pipe 115, header pipes 130A-D, and diagonals 150A-D of the BDSRA 10 may move in the longitudinal direction along cable 315 in the directions as indicated by arrow 192. One or more pulleys 310 are configured to secure the cable 315 to BDSRA 10. Although four pulleys 310 are illustrated, one of ordinary skill in the art will readily appreciate that the quantity of pulleys may range from one to three or greater than four.

With continued reference to FIG. 3A, rolling supports 170 support at least a portion of the BDSRA 10 as the collection pipe 115, header pipes 130A-D, and diagonals 150A-D move along basin floor 102. The rolling supports 170 as shown may be vertical and/or horizontal wheels or casters that are configured to move along basin floor 102 and one or more side walls (e.g., third wall 305). In some embodiments, rolling supports 170 move along one or more side walls such as first wall 105, second wall 110, third wall 305, fourth wall (not shown) or any combination thereof. The rolling supports may be configured to position the BDSRA 10 at a predetermined height above the basin floor 102.

As rolling supports 170 move along basin floor 102, the disturbing member 190 may break up solids and other collected sludge that have settled along basin floor 102. The sludge is then received via one or more header pipes 130A-D, moved through BDSRA 10, and discharged out of basin 5 via discharge outlet 185 as described herein.

Figure 3B:
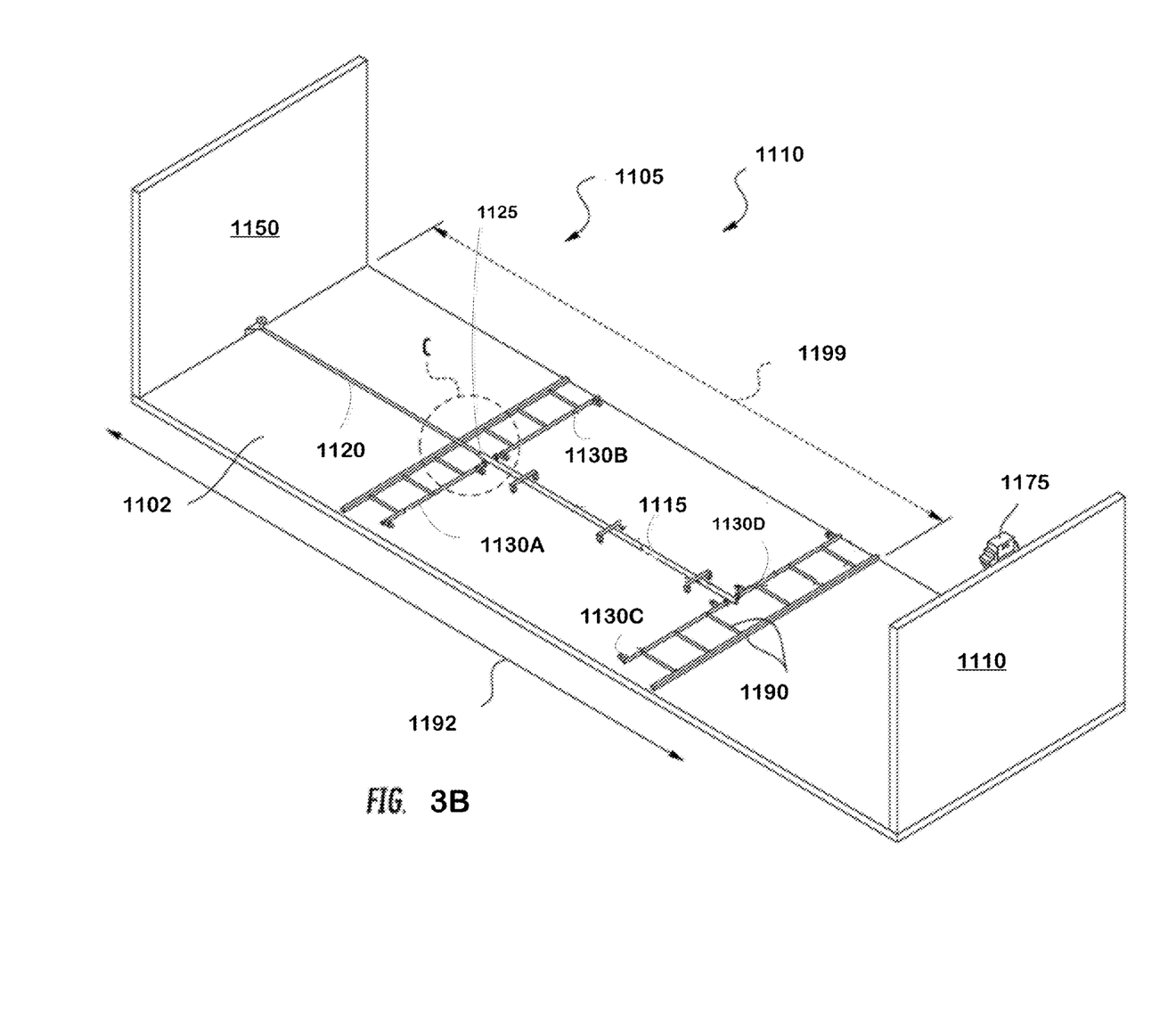
FIG. 3B illustrates a perspective view of a sludge removal assembly structured in accordance with various embodiments.

With reference now to FIG. 3B, an embodiment of an SRA 1110 according to some embodiments discussed herein is shown. An "SRA" as used herein refers to a sludge removal assembly that is positioned at the bottom of water treatment facility basins which does not necessarily include balancing diagonals, in accordance with some embodiments described herein. The depicted SRA 1110 may be used in a basin 1105. The SRA 1110 may include a plurality of pipes (each separately defined below) that are intended to be submerged within basin 1105.

The SRA 1110 may include collection pipe 1115 that is configured to receive sludge flowing in from various header pipes 1130A-D. In some embodiments, collection pipe 1115 is sized to slideably receive discharge pipe 1120 proximate solid collection discharge end 1125 of collection pipe 1115.

The SRA 1110 may further include one or more header pipes 1130A-D configured to remove sludge from basin floor 1102. The header pipes 1130A-D may extend from collection pipe 1115 and may define collection apertures through which sludge may flow from the basin 1105 into the SRA 1110.

Figure 4:
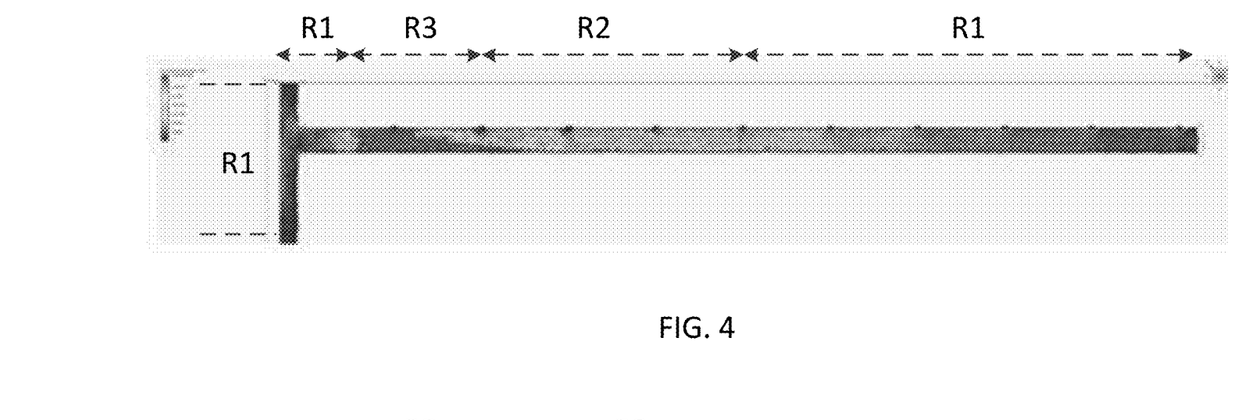
FIG. 4 is a visual model or representation of sludge flows through an example header pipe that does not include a balanced diagonal.
Figure 5:
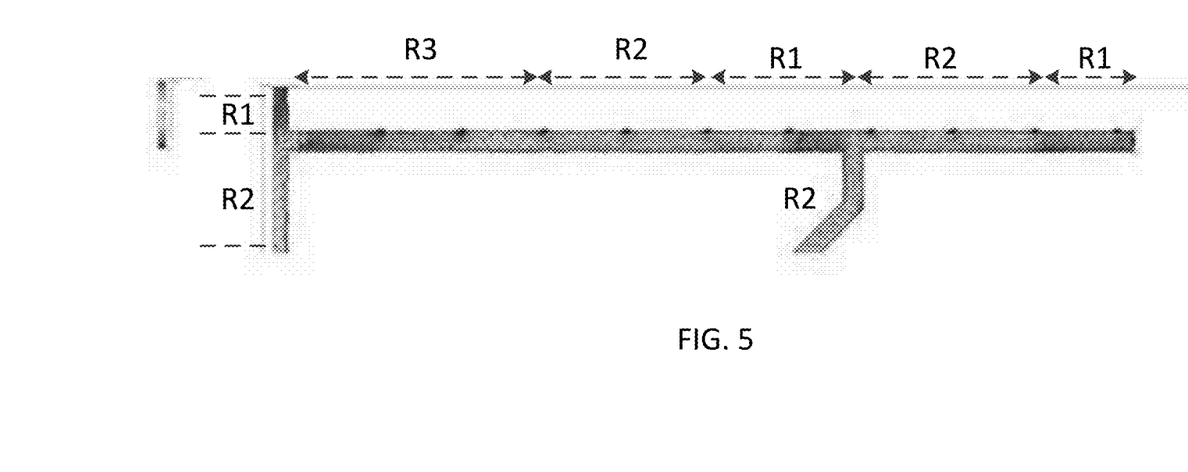
FIG. 5 is a visual model or representation of sludge flows through an example header pipe that includes a balanced diagonal in accordance with various embodiments.

FIGS. 4 and 5 illustrate comparative exemplary diagrams of the flow of sludge from header pipe 130 to collection pipe 115. FIG. 4 illustrates a flow analysis of a header pipe 130 receiving sludge via collection apertures 142 and having no flow-balancing diagonal as shown in the SRA 1110 of FIG. 3B. The depicted header pipe 130 and collection pipe 115 flow path may define various low flow regions R1, moderate flow regions R2, and high flow regions R3. In the depicted embodiment, high flow regions are generally concentrated closer to the junction between the collection pipe 115 and the header pipe 130 leaving the central and distal portions (i.e., portions displaced away from the collection pipe junction) of the header pipe 130 with areas of relative low flow. However, in the embodiment show in FIG. 4, the flow in the header 130 reaches a bottleneck near the collection pipe 115 and is reduced to a low flow R1 in both the portions of the header 130 and collection pipe 115 around their junction. This bottleneck may limit the total flow out of the header pipe 130 caused by the limited flow path and hard right angle junction between the header pipe 130 and the collection pipe 115. Because not enough flow is available to provide adequate flow or suction to each of the collection apertures 142, only the apertures closest to the collection pipe 115 have a high R3 or moderate R2 flow rate.

With continued reference to FIG. 4, the depicted header pipe 130 and collection pipe 115 structure results in a system that removes sludge much more efficiently proximate the junction between the header pipe 130 and collection pipe 115 than in other areas of header pipe 130. This result may not be desirable for a variety of applications, particularly those where a more even sludge removal profile is expected along the entire length of the header pipe 130.

FIG. 5 illustrates a reduction in the amount of low flow regions R1 when compared to FIG. 4 and results in higher flow in the collection pipe 115 and discharge pipe 120. The flows proceeding though header pipe 130 are also generally more balanced along the length of the length of the header 130, such that sludge is more evenly collected across the width of the basin 5. In the embodiment shown in FIG. 5, the diagonal 150 engages the header pipe 130 proximate the seventh of ten example apertures 142. In some embodiments, the diagonal 150 engages the header pipe 130 at a location approximately sixty-five (65) percent to seventy (70) percent along the length of the header pipe as shown in FIG. 5. In some embodiments, sludge may flow via discharge pipe 120 at a minimum rate of fifty (50) gpm (gallons per minute) to a maximum rate of one thousand (1,000) gpm.

In the depicted embodiment, sludge may flow to collection pipe 115 through header pipe 130 and through balancing diagonal 150 (e.g., through first and second sludge communication paths P1, P2 shown in FIG. 1D). The inclusion of balancing diagonal 150 balances the flow profile along header pipe 130 better, by allowing multiple flow paths and reducing the bottleneck effect of the junction between the header pipe and the collection pipe. For example, while a small high flow region R3 persists proximate the collection pipe 115 junction, a large area of intermediate flow R2 is created extending nearly the entire length of the header pipe 130. The increase in intermediate flow R2 within collection pipe 115 and header pipe 130 and the decrease in bottlenecking at the junction of header pipe 130 and collection pipe 115 increases the flow in the collection pipe 115 and increases the sludge collection rate of the BDSRA. In some embodiments, the increase in region R2 may result from, for example, less friction and less pressure encountered as sludge moves with respect to the walls of header pipe 130 and the reduction of the distance sludge has to travel as pressure (e.g., vacuum pressure) is applied. In this regard, as will be apparent to one of ordinary skill in the art in view of this disclosure, sludge is more efficiently removed (e.g., at a discharge rate at, or between, zero (0) and three hundred (300) gallons per minute) along the length of header pipe 130 when compared to the embodiment depicted in FIG. 4.

Figure 6:
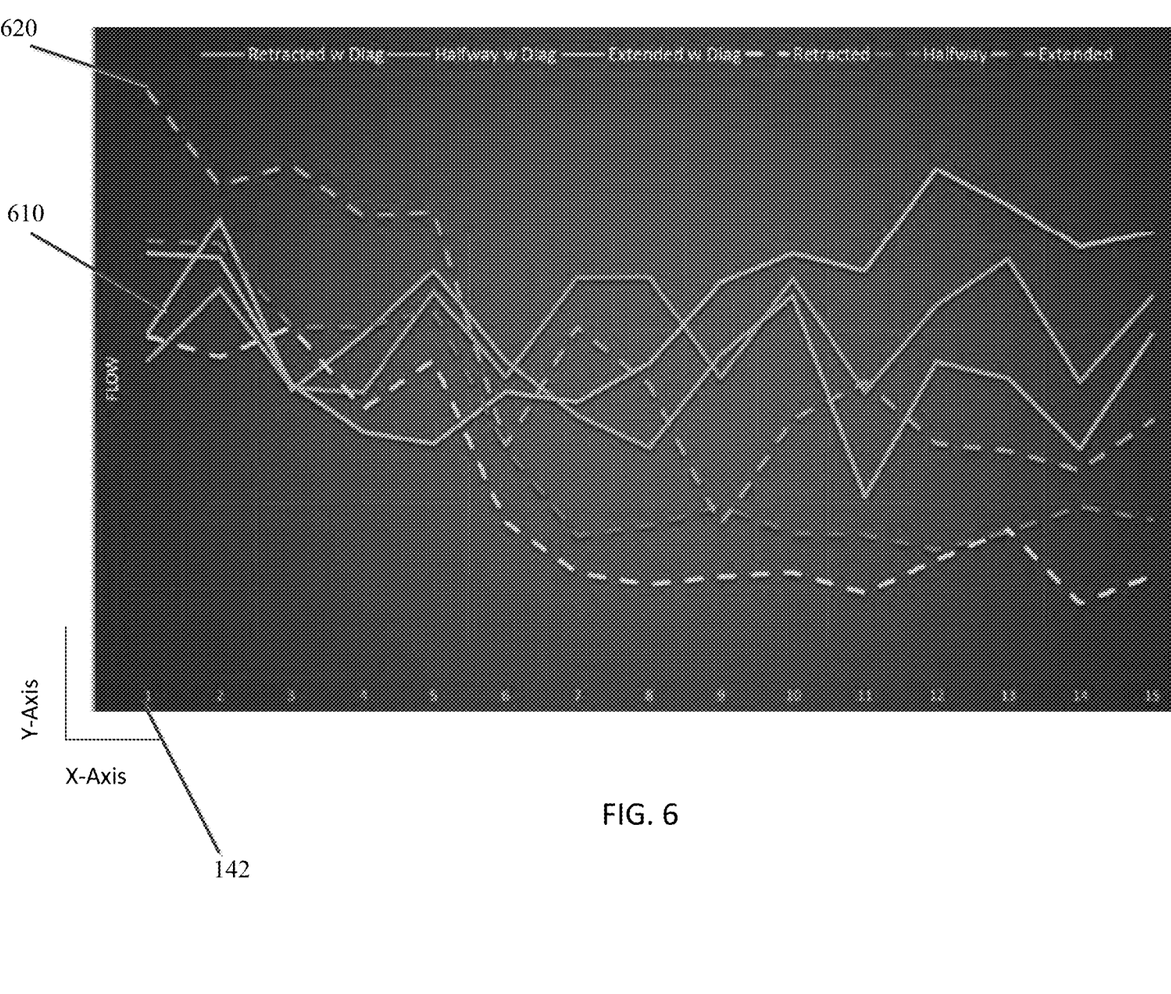
FIG. 6 is a visual model or representation of sludge flows through an example effluent end.
Figure 7:
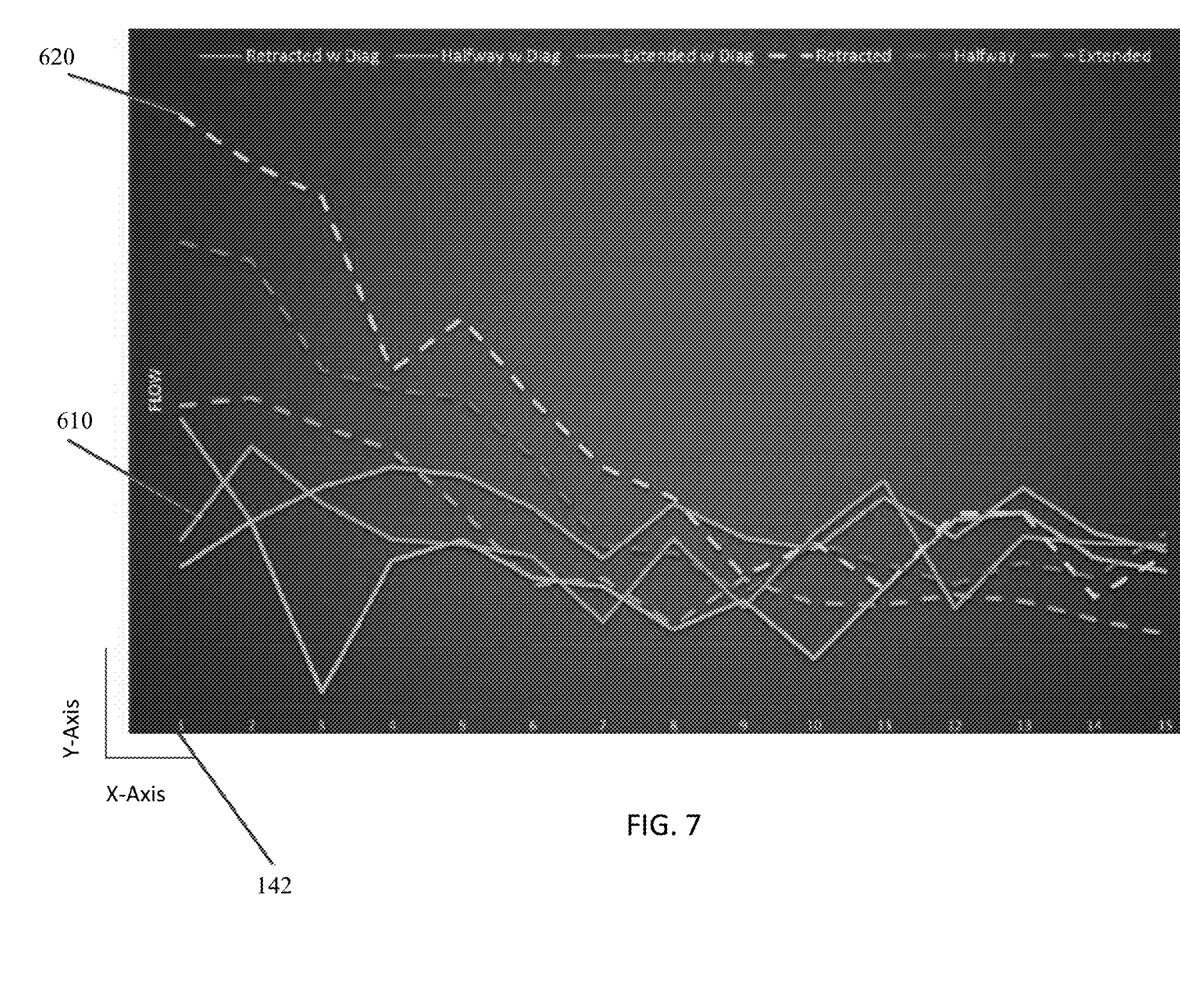
FIG. 7 is a visual model or representation of sludge flows through an example influent end in accordance with various embodiments.

FIGS. 6 and 7 illustrate comparative exemplary diagrams of the flow of sludge from header pipe 130 to collection pipe 115 based on the end of the BDSRA receiving sludge with and without diagonals and in each of the extended, retracted, and half-way positions. FIG. 6 illustrates the flow of sludge from the effluent end (e.g., the end of BDSRA 10 nearest discharge outlet 185) to collection pipe 115 via collection apertures 142 (e.g., collection apertures 142 numbered 1 to 15 along the x-axis beginning with the collection aperture nearest collection pipe 115). The flow is measured at each collection aperture 142 along the length of header pipes 130. Solid lines 610 indicate the flow through one or more collection apertures 142 with balancing diagonals 150 (e.g., the flow through BDSRA 10 as described herein), while dashed lines 620 represent the flow through collection apertures 142 without balancing diagonals (e.g., the flow through SRA 1110 as described herein with reference to FIG. 3B). As depicted, the flow through collection apertures 142 with balancing diagonals 150 maintains a generally flat trend through the link of the pipe. The flow through collection apertures 142 without balancing diagonals 150 may result in sharp spikes at collection apertures 142 (e.g., aperture #1) closest to collection pipe 115 and header pipe 130 and drops through the length of header pipe 130. The balancing diagonals 150 may further balance the flow of sludge between the influent end (e.g., the end of BDSRA 10 opposite discharge outlet 185) as referenced in FIG. 7 and the effluent end as referenced in FIG. 6.

In addition to balancing the flow along each of the header pipes 130, the flow balancing diagonals 150 also balance flow between header pipes. For example, in the example test embodiment shown in FIGS. 6 and 7 having flow balancing diagonals, the discharge pipe 120 received 52%, 51%, and 51% of the flow from the effluent header pipes (e.g., the header pipes closest to the discharge outlet 185) in the retracted, half-travel, and extended positions respectively. In contrast, in the example test embodiment shown in FIGS. 6 and 7 without flow balancing diagonals, the discharge pipe 120 received 32%, 41%, and 49% of the flow from the effluent header pipes (e.g., the header pipes closest to the discharge outlet 185) in the retracted, half-travel, and extended positions respectively.

Because of the fixed length of the discharge pipe 120, the discharge pipe terminates within the collection pipe 115 proximate the middle of the basin as discussed above. This causes sludge from the effluent end to travel in a space between the discharge pipe and the collection pipe to reach the opening in the discharge pipe. This space between the discharge pipe 120 and collection pipe 115 provides a narrower flow area than the total diameter of the collection pipe 115. As such, the flow from the header pipes at the influent end of the collection pipe 115 (e.g., the header pipes 130 farthest from the discharge outlet 185) is received in a larger flow area within the collection pipe due to the discharge pipe generally not blocking the collection pipe at the influent header pipes. Said differently, the discharge pipe 120 may not obstruct the influent headers for large portions of the travel of the BDSRA 10 components (e.g., the discharge pipe 120 may be closer to the influent header pipes in the retracted position).

In the embodiments discussed above, the test embodiment without flow balancing diagonals had the greatest difference in flow in the retracted position, where the flow from the effluent headers travels the farthest between the discharge pipe 120 and the collection pipe 115, and the test embodiment without flow balancing diagonals had the least difference in flow in the extended position, where the flow from the effluent headers travels its shortest distance between the discharge pipe 120 and the collection pipe 115. Thus, in embodiments without balancing diagonals 150, the flow may be influenced by the location of header pipe 130 by the position of BDSRA 10 over the length of travel along basin floor 102.

As discussed herein, the flow balancing diagonals 150 may each engage the collection pipe 115 proximate a longitudinal center of the pipe (e.g., as shown in FIG. 3A). In some embodiments, one or more of the diagonals 150 may engage the collection pipe 115 closer to another diagonal than to each of the header pipes 130 (e.g., as shown in FIG. 1A, 1B, and 3A). The diagonals 150 may cause the second sludge communication path P2 (as depicted in FIG. 1D) of each of the headers to terminate at the collection pipe 115 closer to the center of the collection pipe than the junctions between the header pipes 130 and the collection pipe. In such embodiments, the flow between respective header pipes 130 may be balanced by providing multiple flow paths at differing locations along the collection pipe 115 to reduce the influence of the discharge pipe 120 on the effluent header pipes and maintain even flow within each header and between respective headers as the collection pipe 115 moves between the retracted and extended positions.

CONCLUSION

Various other features for, modifications to and other embodiments of the inventions set forth herein will come to mind to one skilled in the art to which these inventions pertain having the benefit of the teachings presented in the foregoing descriptions and the associated drawings. For example, while examples discussed herein are often related to solid removal apparatuses (e.g., balanced diagonal sludge removal assemblies), one skilled in the art would appreciate that various types of sludge removal apparatuses as well as other types of apparatuses may benefit from embodiments discussed herein. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

The invention claimed is:

1. A balanced diagonal sludge removal assembly configured for use in a basin, the balanced diagonal sludge removal assembly comprising:
    a discharge pipe;
    a collection pipe configured to slideably receive at least a portion of the discharge pipe, such that the collection pipe is configured to move in a longitudinal direction relative to the discharge pipe;
    one or more header pipes extending from the collection pipe to define a first sludge communication path between the one or more header pipes and the collection pipe; and
    one or more balancing diagonals extending between the collection pipe and the one or more header pipes to define a second sludge communication path between the one or more header pipes and the collection pipe, wherein the one or more balancing diagonals are configured to at least partially balance flow distribution throughout the one or more header pipes.

2. The balanced diagonal sludge removal assembly of claim 1, wherein the discharge pipe defines a discharge outlet configured to fluidly connect the assembly to the basin wall, wherein the discharge pipe is configured to discharge sludge from the basin via the discharge outlet.

3. The balanced diagonal sludge removal assembly of claim 1, wherein the one or more header pipes define one or more collection apertures, wherein each of the collection apertures is configured to receive, via vacuum pressure, sludge from the basin.

4. The balanced diagonal sludge removal assembly of claim 1, wherein the one or more balancing diagonals further comprise a neck joint disposed proximate at least one of the collection pipe or the one or more header pipes, and wherein a portion of the one or more flow balancing diagonals extending between the neck joint and the at least one of the collection pipe or the one or more header pipe is in perpendicular engagement with the at least one of the collection pipe or the one or more header pipe.

5. The balanced diagonal sludge removal assembly of claim 1, wherein the collection pipe, the one or more header pipes, and the one or more balancing diagonals are configured to move from a retracted position to an extended position, and wherein a greater portion of the discharge pipe is received in the collection tube in the retracted position than in the extended position.

6. The balanced diagonal sludge removal assembly of claim 1, wherein the collection pipe defines a solid collection discharge end configured to receive the discharge pipe therethrough to facilitate the movement of the collection pipe.

7. The balanced diagonal sludge removal assembly of claim 6, wherein a water-tight bearing seal is disposed at the solid collection discharge end between the collection pipe and the discharge pipe, such that the water-tight bearing seal is configured to receive the discharge pipe and seal the solid collection discharge end.

8. The balanced diagonal sludge removal assembly of claim 1, wherein the one or more headers comprise a first header and a second header, wherein the first header is disposed parallel to the second header, wherein the one or more balancing diagonals comprise a first diagonal and a second diagonal, wherein the first diagonal extends between the collection pipe and the first header pipe, and wherein the second diagonal extends between the collection pipe and the second header pipe.

9. The balanced diagonal sludge removal assembly of claim 8, wherein the first diagonal engages the collection pipe closer to the second diagonal than to the first header, and wherein the second diagonal engages the collection pipe closer to the first diagonal than to the second header.

10. The balanced diagonal sludge removal assembly of claim 9, wherein the first diagonal and the second diagonal each engage the collection pipe proximate a longitudinal center of the pipe.

11. The balanced diagonal sludge removal assembly of claim 8, wherein the first header is disposed proximate a solid collection discharge end of the collection pipe, and wherein the second header is disposed proximate an opposing end of the collection pipe.

12. The balanced diagonal sludge removal assembly of claim 8, wherein the first header and the second header are collinear.

13. A method for manufacturing a balanced diagonal sludge removal assembly configured for use in a basin, the method comprising:
providing a discharge pipe;
providing a collection pipe configured to slideably receive at least a portion of the discharge pipe, such that the collection pipe is configured to move in a longitudinal direction relative to the discharge pipe;
attaching one or more header pipes to the collection pipe, such that the one or more header pipes extend from the collection pipe to define a first sludge communication path between the one or more header pipes and the collection pipe; and
attaching one or more balancing diagonals to the collection pipe and the one or more header pipes, such that the one or more balancing diagonals extend between the collection pipe and the one or more header pipes to define a second sludge communication path between the one or more header pipes and the collection pipe, wherein the one or more balancing diagonals are configured to at least partially balance flow distribution throughout the one or more header pipes.

14. The method of claim 13, wherein the one or more balancing diagonals further comprise a neck joint disposed proximate at least one of the collection pipe or the one or more header pipes, wherein a portion of the one or more flow balancing diagonals extending between the neck joint and the at least one of the collection pipe or the one or more header pipe is in perpendicular engagement with the at least one of the collection pipe or the one or more header pipe.

15. The method of claim 13, wherein the collection pipe, the one or more header pipes, and the one or more balancing diagonals are configured to move from a retracted position to an extended position, and wherein a greater portion of the discharge pipe is received in the collection tube in the retracted position than in the extended position.

16. The method of claim 13, wherein the one or more headers comprise a first header and a second header, wherein the first header is attached to the collection pipe parallel to the second header, wherein the one or more balancing diagonals comprise a first diagonal and a second diagonal, wherein the first diagonal is attached between the collection pipe and the first header pipe, and wherein the second diagonal is attached between the collection pipe and the second header pipe.

17. The method of claim 16, wherein attaching one or more balancing diagonals to the collection pipe and the one or more header pipes comprises attaching the first diagonal to the collection pipe closer to the second diagonal than to the first header, and wherein attaching one or more balancing diagonals to the collection pipe and the one or more header pipes comprises attaching the second diagonal to the collection pipe closer to the first diagonal than to the second header.

18. The method of claim 17, wherein attaching one or more balancing diagonals to the collection pipe and the one or more header pipes comprises attaching each of the first diagonal and the second diagonal to the collection pipe proximate a longitudinal center of the pipe.

19. The method of claim 16, wherein attaching one or more balancing diagonals to the collection pipe and the one or more header pipes comprises attaching the first header to the collection pipe proximate a solid collection discharge end of the collection pipe, and wherein the second header is disposed proximate an opposing end of the collection pipe.

20. The method of claim 16, wherein the first header and the second header are collinear.

\* \* \* \* \*